United States Patent
Winsor et al.

(10) Patent No.: US 9,432,622 B1
(45) Date of Patent: Aug. 30, 2016

(54) HIGH-SPEED VIDEO INTERFACES, VIDEO ENDPOINTS, AND RELATED METHODS

(71) Applicant: Sorenson Communications, Inc., Salt Lake City, UT (US)

(72) Inventors: Eric V. Winsor, West Jordan, UT (US); Mark D. Nelson, West Jordan, UT (US); Conrad A. Maxwell, Herriman, UT (US); Brent C. Giles, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

(21) Appl. No.: 14/741,296

(22) Filed: Jun. 16, 2015

(51) Int. Cl.
  *H04N 7/15* (2006.01)
  *H04N 7/14* (2006.01)

(52) U.S. Cl.
  CPC .............. *H04N 7/15* (2013.01); *H04N 7/141* (2013.01)

(58) Field of Classification Search
  CPC ........ H04N 7/14; H04N 4/141; H04N 4/147; H04M 3/42391; H04M 1/575; H04M 19/04; H04M 19/08; H04L 12/1827
  USPC ................. 348/14.01–14.16; 379/52, 142.06
  See application file for complete search history.

(56) References Cited

U.S. PATENT DOCUMENTS

| | | |
|---|---|---|
| 5,283,637 A | 2/1994 | Goolcharan |
| 5,438,571 A | 8/1995 | Albrecht et al. |
| 5,974,464 A | 10/1999 | Shin et al. |
| 6,346,964 B1 | 2/2002 | Rogers et al. |
| 6,986,676 B1 | 1/2006 | Tronolone et al. |
| 7,908,623 B2 | 3/2011 | Matic et al. |
| 8,776,163 B2 | 7/2014 | Cirstea et al. |
| 8,804,775 B2 | 8/2014 | Lida et al. |
| 2006/0026001 A1* | 2/2006 | Bravin ................. G09B 21/009 704/270.1 |
| 2007/0057912 A1* | 3/2007 | Romriell ................ G06F 3/017 345/156 |
| 2007/0081646 A1* | 4/2007 | Cupal ................. H04M 1/2475 379/142.06 |
| 2008/0125095 A1* | 5/2008 | Mornhineway ....... H04M 1/576 455/412.2 |
| 2009/0116583 A1 | 5/2009 | Lida et al. |
| 2009/0245345 A1 | 10/2009 | Lee et al. |
| 2010/0104029 A1 | 4/2010 | Lee et al. |
| 2012/0081504 A1* | 4/2012 | Ng ........................... H04N 7/15 348/14.08 |
| 2012/0210384 A1 | 8/2012 | Cirstea et al. |
| 2013/0328997 A1* | 12/2013 | Desai ..................... H04N 7/141 348/14.02 |
| 2014/0022383 A1* | 1/2014 | Huang ...................... G06T 9/00 348/143 |
| 2014/0267579 A1* | 9/2014 | Montero ................ H04N 7/147 348/14.11 |
| 2014/0347440 A1* | 11/2014 | Hatcher .................. B60R 11/04 348/36 |

* cited by examiner

*Primary Examiner* — Melur Ramakrishnaiah
(74) *Attorney, Agent, or Firm* — TraskBritt

(57) ABSTRACT

High-speed video interfaces, video endpoints, and related methods are disclosed. A high-speed video interface includes a system cable, a remote camera unit, and a main processing unit. The system cable includes one or more twisted pairs. A method includes capturing near-end video images including multi-channel, high-definition video data, serializing the video data, and transmitting the serialized video data to the main processing unit through a single one of the one or more twisted pairs of the system cable with the remote camera unit. The method also includes deserializing the serialized video data with the main processing unit. A video endpoint configured to enable an audibly impaired user to participate in video communication sessions for audibly impaired users includes the high-speed video interface.

21 Claims, 7 Drawing Sheets

HIGH-SPEED VIDEO INTERFACES, VIDEO ENDPOINTS, AND RELATED METHODS

FIELD

Embodiments of the disclosure relate to high-speed video interfaces and related methods, and more particularly to video endpoints including high-speed video interfaces configured for use in an audibly impaired environment.

BACKGROUND

The video industry has progressively provided for higher and higher resolution video. For example, high-definition video (e.g., 720p, 1080i, 1080p, 4k UHD, 8k UHD, etc.) is now standard in many common electronic video devices. Televisions, computers, cameras, smartphones, tablets, and many other electronic video devices commonly include high-definition video capture, processing, and/or display capabilities.

Of course, constructing higher-resolution video images requires more video data to generate the video images than lower-resolution video images. As a result, a relatively large amount of video data is often transmitted to, transmitted from, stored in, and/or processed by high-definition video electronic devices. In order to deliver larger amounts of data in a short amount of time, manufacturers of high-definition video equipment have often resorted to higher-frequency communication interfaces to transmit and receive video data.

Electrical transmission lines carrying video data at high frequencies may be prone to emit and be effected by electrical magnetic interference (EMI). This EMI may corrupt the data transmitted by these electrical transmission lines, and/or effect circuit components proximate to the electrical transmission lines (e.g., antennas and signal lines in cellular phones).

Some manufacturers of high-definition video equipment have responded to these EMI problems by utilizing video compression techniques to reduce the amount of video data that needs to be transmitted through electrical transmission lines. Another approach some manufacturers of high-definition video equipment have taken involves the use of expensive optical and coaxial transmission lines that do not generate as much EMI and are less sensitive to EMI from other sources.

BRIEF SUMMARY

In some embodiments, disclosed is a high-speed video interface including a system cable. The system cable includes one or more twisted pairs. The high-speed video interface also includes a remote camera unit. The remote camera unit includes a camera configured to capture near-end video images, and provide video data including high-definition uncompressed multi-channel video data corresponding to the near-end video images. The remote camera unit also includes a serializer configured to receive and serialize the video data into a single serial stream of serialized video data, and output the serialized video data to a single one of the one or more twisted pairs of the system cable. The high-speed video interface also includes a main processing unit operably coupled to the remote camera unit through the system cable. The main processing unit is configured to receive the serialized video data through the single one of the one or more twisted pairs of the system cable. The main processing unit includes a deserializer configured to deserialize the serialized video data. The main processing unit also includes a processing element configured to process the video data.

In some embodiments, disclosed is a method of operating a high-speed video interface. The method includes capturing video data including uncompressed high-definition multi-channel video data with a camera of a remote camera unit. The method also includes serializing the video data into a single stream of serialized data, and transmitting the serialized video data through a single twisted pair of a system cable to a main processing unit. The method further includes deserializing the serialized video data with the main processing unit.

In some embodiments, disclosed is a video endpoint configured for use by an audibly impaired user to participate in video communication sessions with a video relay service. The video endpoint includes a remote camera unit including a camera and a serializer. The camera is configured to capture video data including multi-channel high-definition video data corresponding to near-end video. The serializer is operably coupled to the camera and is configured to serialize the video data into a single data stream. The video endpoint may also include a system cable including one or more twisted pairs. The video endpoint may further include a main processing unit operably coupled to the remote camera unit through the system cable. The main processing unit is configured to receive the single serial data stream from the remote camera unit through a single one of the one or more twisted pairs. The main processing unit includes a deserializer and a processing element. The deserializer is configured to convert the single serial data stream into the multi-channel high-definition video data. The processing element is configured to receive and process the multi-channel high-definition video data.

In some embodiments, disclosed is a video endpoint configured to enable an audibly impaired user to participate in communication sessions with far-end users of audio endpoints with the assistance of a video relay service configured to provide translation between video communications of the video endpoint and voice communications of the audio endpoint. The video endpoint includes a system cable, a remote camera unit, and a main processing unit. The system cable includes a remote camera unit connector, a main processing unit connector, and a plurality of twisted pairs operably coupling the remote camera unit connector to the main processing unit connector. The remote camera unit is configured to operably couple to the remote camera unit connector of the system cable. The remote camera unit includes a camera and a serializer. The camera is configured to capture video data comprising multi-channel high-definition video data corresponding to near-end video of the audibly impaired user communicating using non-verbal gestures. The serializer is operably coupled to the camera and configured to serialize the video data into a single serial data stream. The main processing unit is operably coupled to the main processing unit connector of the system cable and to an electronic display through a video cable. The main processing unit is configured to receive the single serial data stream from the remote camera unit through a single one of the one or more twisted pairs. The main processing unit includes a deserializer, one or more communication elements, and control circuitry. The deserializer is configured to convert the single serial data stream into the multi-channel video signal. The one or more communication elements are configured to enable the main processing unit to communicate with the video relay service through a video data link. The control circuitry is configured to receive the multi-channel video signal from the deserializer, transmit the near-end video to the relay service through the one or more communication elements, receive far-end video from the relay service through the one or more communication elements, and display the far-end video on the electronic display.

DETAILED DESCRIPTION

Figure 1:
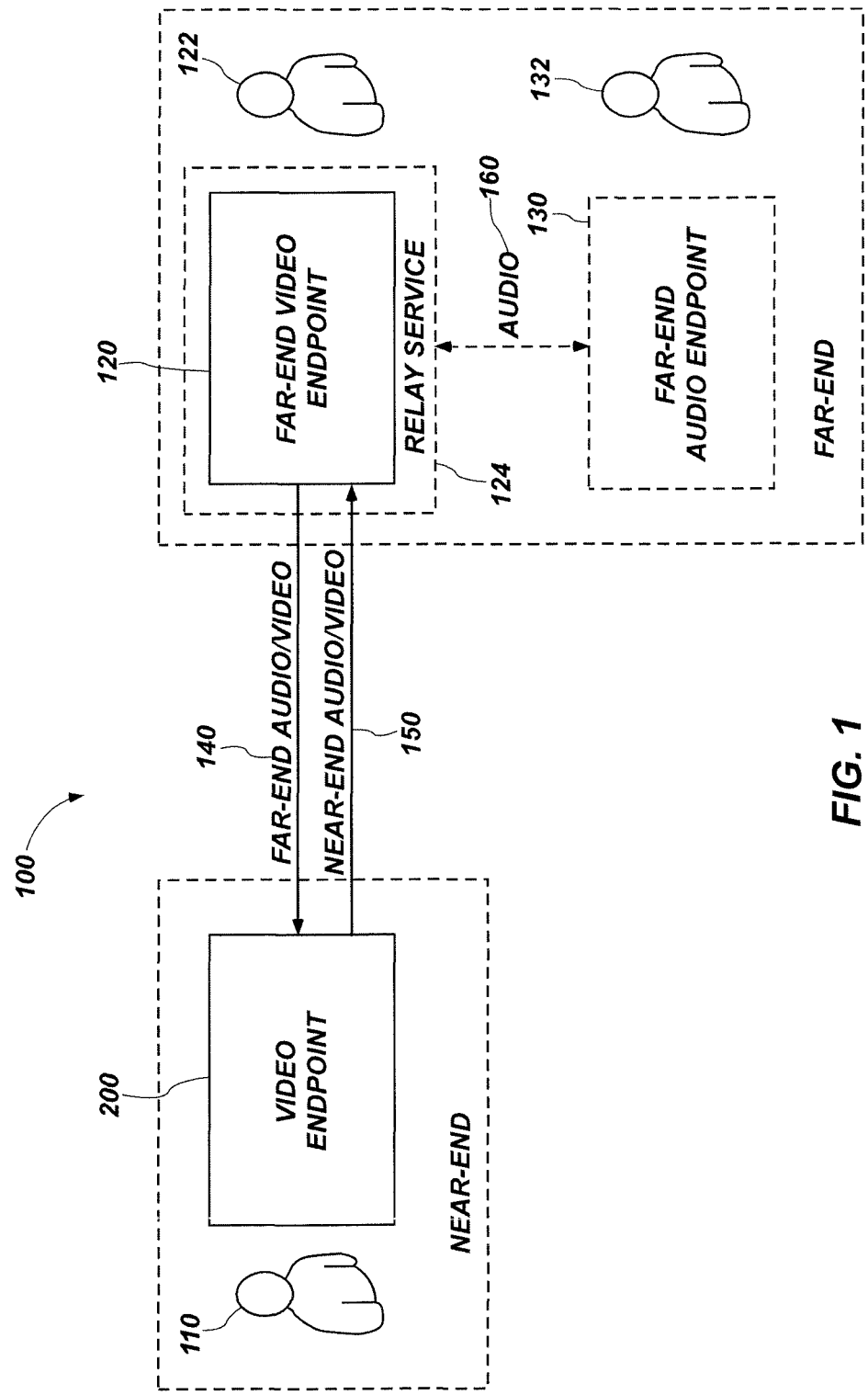
FIG. 1 is a simplified block diagram of a communication system for audibly impaired users.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

The disclosure also provides meaningful limitations in one or more particular technical environments that go beyond an abstract idea. For example, embodiments of the disclosure provide improvements in the technical fields of high-speed video communication, and substantially real-time video communications for audibly impaired users. In addition, embodiments of the disclosure improve the functionality of video endpoints. In particular, embodiments of the disclosure improve transmission of multi-channel high-definition video data through a system cable.

In addition, it is noted that the embodiments may be described in terms of a process that is depicted as a flow-chart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 242) and specifically indicated by a numeric indicator preceded by a "dash" (e.g., 242-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the disclosure include high-speed video interfaces, video endpoints including high-speed video interfaces, and related methods. It should be noted that while the utility and application of the various embodiments of the disclosure are described with reference to an audibly impaired environment, the disclosure also finds application to any environment where a high-speed video interface may be helpful or desirable.

FIG. 1 is a simplified block diagram of a communication system 100 for audibly impaired users. As used herein, the term "audibly impaired" refers to people who have at least some audible impairment (e.g., deaf, hard of hearing, and verbally impaired people). The communication system 100 may include a video endpoint 200 configured to enable an audibly impaired user 110 at a near-end location to participate in video communication sessions with a far-end user 122 of a far-end video endpoint 120 located at a far-end location. The terms "near-end" and "far-end" are used herein with reference to the location of the video endpoint 200. Accordingly, the video endpoint 200 is located at the near-end. Locations remote to the video endpoint 200 are, therefore, far-end locations. Of course, it is recognized that "near-end" and "far-end" are relative terms depending on the perspective of the particular user. Thus, the terms "near-end" and "far-end" are used as a convenient way to distinguish between users and devices.

During video communication sessions between the video endpoint 200 and the far-end video endpoint 120, the video endpoint 200 may transmit data corresponding to near-end audio/video communications 150 (hereinafter referred to as "near-end audio/video" 150) to the far-end video endpoint 120. Also, the video endpoint 200 may receive data corresponding to far-end audio/video communications 140 (hereinafter referred to as "far-end audio/video" 140) from the far-end video endpoint 120. The near-end audio/video 150 and the far-end audio/video 140 may include video images of the audibly impaired user 110 and the far-end user 122, respectively, communicating using gestures. By way of non-limiting example, the gestures may include American Sign Language (ASL) communication.

The video endpoint 200 may be configured to capture, process, receive, and transmit high-definition video. As used herein, the term "high-definition video" refers to video with resolutions greater than standard definition video. As used herein, the term "standard definition video" refers to video with resolution lower than or equal to 576i (international standard definition television). Video with resolution of 480i (U.S. standard definition television), has lower resolution than 576i, and so is considered standard definition video herein. By way of non-limiting example, high-definition video may include 720p, 1080i, 1080p, 1440p, 4K UHDTV, 8K UHD video, and other forms of high definition video. In order to provide the near-end audio/video 150 in high-definition, and in substantially real-time, the video endpoint 200 may include a high-speed video data interface, as will be discussed in more detail below. As used herein, the term "substantially real-time" video refers to providing video a short time after the video is captured. A short time may be less than or equal to about a few seconds (e.g., 5 seconds, 3, seconds, 1 second, or less). For example, video images of the audibly impaired user 110 may be considered to be delivered in substantially real time to the far-end video endpoint 120 if the near-end audio/video 150 delivers the video images to the far-end video endpoint 120 within a few seconds after the video endpoint 200 captures the video images.

In some embodiments, the far-end user 122 of the far-end video endpoint 120 may be another audibly impaired user, or an audibly capable user capable of communicating using gestures (e.g., ASL). In such embodiments, the video communication sessions may be point-to-point communication sessions (e.g., through the Internet, PSTN networks, wireless data networks, combinations thereof, etc.) between the video endpoint 200 and the far-end video endpoint 120.

In some embodiments, the far-end user 122 of the far-end video endpoint 120 may be a call assistant at a relay service 124 (i.e., assistive communication service). Thus, at times the far-end user 122 may also be referred to, at times, as the call assistant 122. In these embodiments, the call assistant 122 may provide translation services to enable the audibly impaired user 110 to participate in communication sessions with an audibly capable user 132 of a far-end audio endpoint 130 (e.g., a conventional telephone, cellular phone, VOIP phone, etc.). Although FIG. 1 illustrates both the far-end video endpoint 120 and the far-end audio endpoint 130 within the same box marked "far-end," the far-end video endpoint 120 and the far-end audio endpoint 130 may be located at different far-end locations.

The relay service 124 may be configured to convert the near-end audio/video 150 from the video endpoint 200 into data corresponding to audio communications 160 (hereinafter "audio" 160). For example, the call assistant 122 may speak a voice translation of ASL from the audibly impaired user 110, and generate audio 160 including the voice translation. The relay service 124 may be configured to transmit the audio 160 to the far-end audio endpoint 130 (e.g., through PSTNs, wireless cellular networks, VOIP networks, etc.). The far-end audio endpoint 130 may be configured to convert the audio 160 from the relay service 124 into acoustic waves that may be heard by the audibly capable user 132. The far-end audio endpoint 130 may transmit audio 160 including speech from the audibly capable user 132 to the relay service 124. The call assistant 122 may translate the speech to ASL. The far-end video endpoint 120 may then transmit the far-end audio/video 140 including the ASL to the video endpoint 200. The video endpoint 200 may present video images of the call assistant translating the speech from the audibly capable user 132 into ASL. In this way, the audibly impaired user and the audibly capable user 132 may communicate with each other through the relay service 124.

Figure 2A:
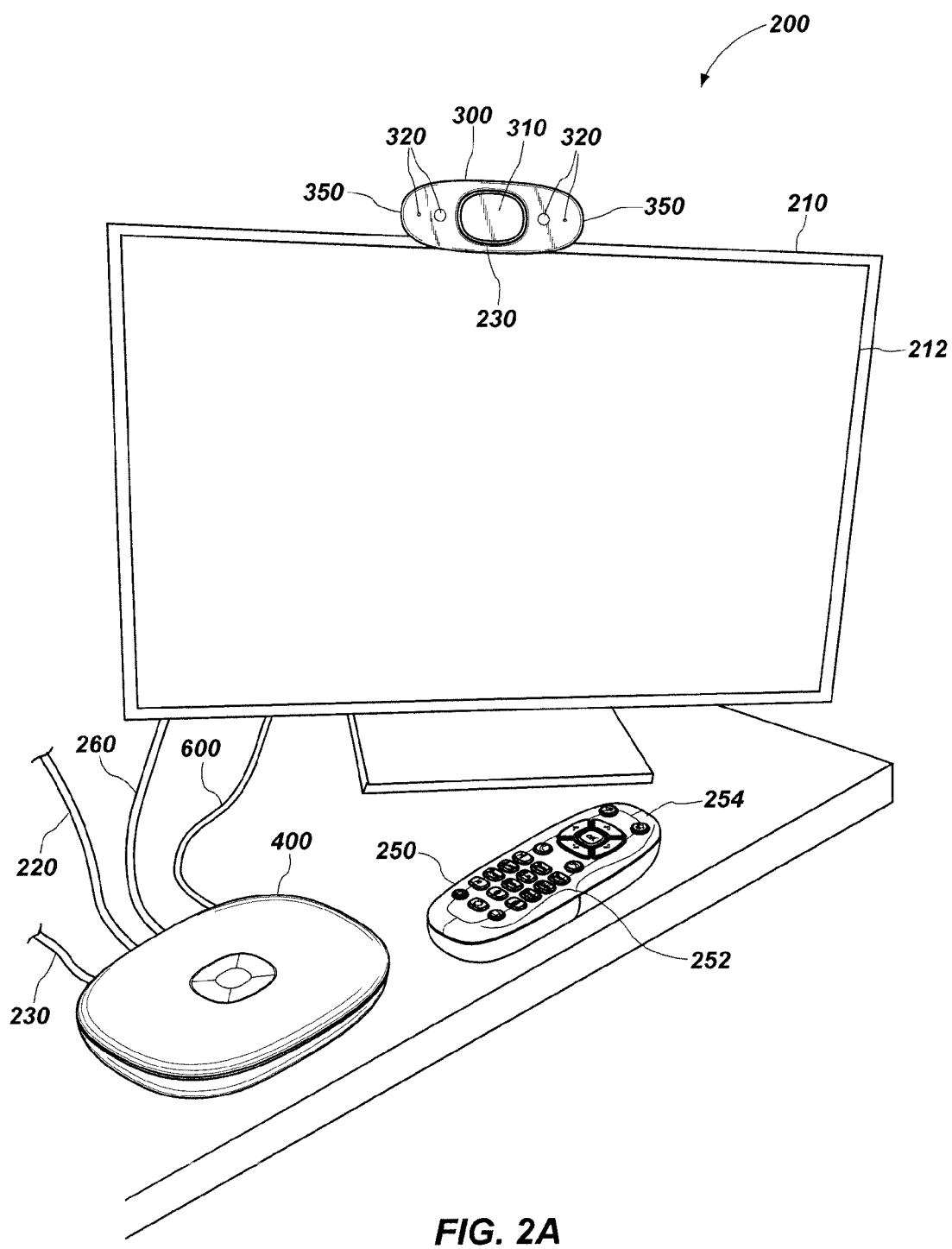
FIG. 2A is a simplified view of a video endpoint of the communication system of FIG. 1.
Figure 2B:
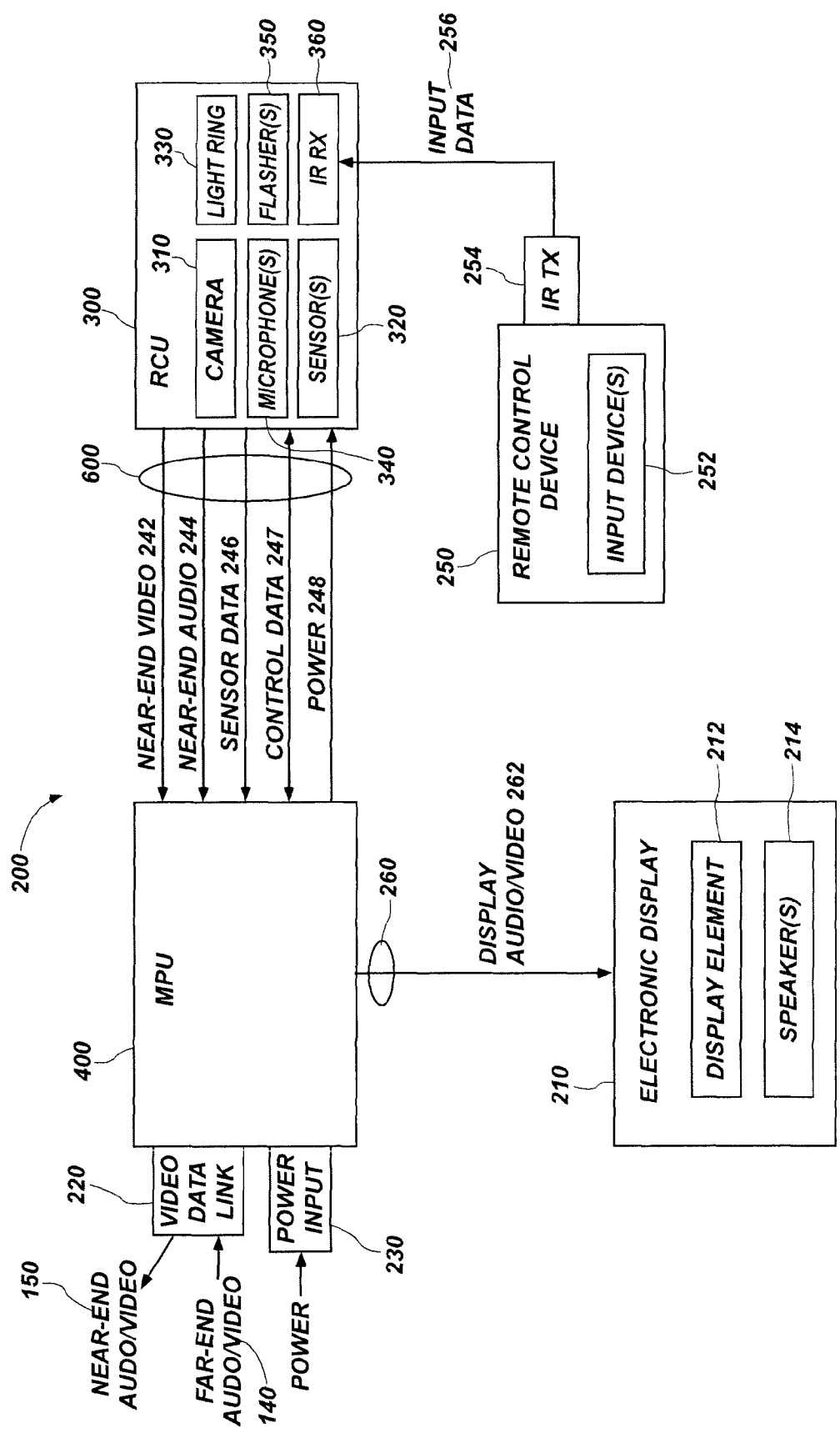
FIG. 2B is a simplified block diagram of the video endpoint of FIG. 2A.

FIG. 2A is a simplified view of the video endpoint 200 of the communication system 100 of FIG. 1. FIG. 2B is a simplified block diagram of the video endpoint 200 of FIG. 2A. Referring to FIGS. 2A and 2B together, the video endpoint 200 may include a Main Processing Unit (MPU) 400, a Remote Camera Unit (RCU) 300, and an electronic display 210. The RCU 300 may include a camera 310 configured to convert uncompressed high-definition video images to high-definition video data, and transmit near-end video 242 including the high-definition video data to the MPU 400. In some embodiments, the high-definition video data may be captured using a multi-channel high-definition protocol. By way of non-limiting example, the high-definition video data may be captured using a four-channel MIPI protocol.

The RCU 300 may be operably coupled to the MPU 400 through a system cable 600. The system cable 600 may include a plurality of twisted pairs (e.g., copper lines) that are shielded and bundled together. The RCU 300 may be configured to serialize and transmit the near-end video 242 to the MPU 400 through a single one of the plurality of twisted pairs. The RCU 300 may be configured to serialize the entire multi-channel high-definition video signal to a single two-channel serial data stream (near-end video 242). The MPU 400 may be configured to de-serialize and process the near-end video 242. By way of non-limiting example, the MPU 400 may be configured to de-serialize the serialized near-end video 242 from the two-conductor serial data stream back to the uncompressed multi-channel high-definition video signal. Accordingly, the MPU 400, the RCU 300, and the system cable 600 may form a high-speed video interface.

As the near-end video 242 includes uncompressed multi-channel high-definition video data, the system cable 600 may deliver a relatively large amount of data from the RCU 300 to the MPU 400. Video compression computations may add delay, which may hinder the video endpoint 200 from delivering the near-end audio/video 150 to the far-end video endpoint 120 in substantially real-time. Also, video compression may adversely affect the quality of the video images. The near-end video 242 may include uncompressed video data to avoid the delays and diminished video image quality that may result from video compression.

In some embodiments, the MPU 400 may be configured as a set-top box, and the RCU 300 may be configured to detachably couple to the electronic display 210 (e.g., television, monitor, etc.), as shown in FIG. 2A. In such embodiments, the system cable 600 may be configured with sufficient length to operably couple the MPU 400 to the RCU 300, and provide flexibility to the audibly impaired user 110 (FIG. 1) to position the MPU 400 and the RCU 300 as closely together or as far apart as desired. By way of non-limiting example, the system cable 600 may be at least about two feet to ten feet long. In some embodiments, the system cable 600 may be about six feet long.

The system cable 600 may also be configured to conduct signals in addition to the near-end video 242 between the MPU 400 and the RCU 300. In some embodiments, the RCU 300 may include one or more microphones 340 (hereinafter "microphones" 340) configured to convert acoustic waves at the near-end to near-end audio signals 244 (hereinafter "near-end audio" 244), which the RCU 300 may transmit to the MPU 400 through the system cable 600. By way of non-limiting example, the near-end audio 244 may include stereo audio, which may be transmitted through a twisted pair of the system cable 600. The MPU 400 may be configured to receive and process the near-end audio 244 from the RCU. By way of non-limiting example, the MPU 400 may be configured to generate the near-end audio/video 150 from the near-end video 242 and the near-end audio 244.

The RCU 300 may also include sensors 320 configured to generate sensor data 246. By way of non-limiting example, the RCU 300 may include a temperature sensor, an ambient light sensor, other sensors, and combinations thereof, to enable the MPU 400 to monitor certain measurable environmental conditions at the near-end. The RCU 300 may be configured to transmit the sensor data 246 through the system cable 600 to the MPU 400. In some embodiments, the sensor data 246 may be serialized (e.g., using a Universal Serial Bus (USB) protocol), and transmitted through a twisted pair of the system cable 600.

The system cable 600 may also be configured to conduct control data 247 between the RCU 300 and the MPU 400. By way of non-limiting example, the control data 247 may be serialized (e.g., using an I$^2$C, a USB, or other protocol). The control data 247 may be conducted through one or more twisted pairs of the system cable 600. In some embodiments, the RCU 300 may include a light ring 330, flashers 350, other visual signaling devices, or combinations thereof, configured to provide visual alerts responsive to detected events (e.g., incoming calls, etc.). U.S. Pat. No. 7,769,141 to Cupal et al., filed Sep. 23, 2005 (hereinafter "Cupal"), and U.S. Pat. No. 8,824,640 to Winsor et al., filed Mar. 12, 2013 (hereinafter "Winsor"), the entire disclosure of each of which is hereby incorporated herein by this reference, disclose spatial visual indicators that indicate occurrences of events. The light ring 330 may include a spatial visual indicator (e.g., for spatial visual caller identification) according to the teachings of Cupal and Winsor. The flashers 350 may be configured to deliver bright bursts of light that the audibly impaired user 110 (FIG. 1) may see even in peripheral vision to attract the attention of the audibly impaired user 110 to the RCU 300. The light ring 330 and the flashers 350 may be at least partially controlled responsive to control data 247 received through the system cable 600 from the MPU 400.

In some embodiments, the video endpoint 200 may include a remote control device 250 configured to enable the audibly impaired user 110 (FIG. 1) to interact with the graphical user interface displayed on the display element 212 of the electronic display 210. The remote control device 250 may include one or more input devices 252 (e.g., buttons) configured to receive user inputs from the audibly impaired user 110, and an infrared transmitter 254 (also referred to herein as "IR transmitter" 254) configured to transmit input data 256 corresponding to the user inputs to the RCU 300. The RCU 300 may include an infrared receiver 360 (also referred to herein as "IR receiver" 360) configured to receive the input data 256 from the remote control device 250. The RCU 300 may be configured to relay the input data 256 to the MPU 400 via the control data 247. In some embodiments, the remote control device 250 may be configured to communicate directly with the MPU 400 (e.g., via a receiver included within the MPU 400).

In some embodiments, the system cable 600 may also be configured to deliver power from the MPU 400 to the RCU 300. By way of non-limiting example, the MPU 400 may include a power input 230 (e.g., a power cord that plugs into an electrical outlet, a battery, a transformer, other power source, or combinations thereof) configured to receive power. The MPU 400 may be configured to provide the power 248 to the RCU 300. In some embodiments, the RCU 300 may be configured to operate on the power 248 delivered by the MPU 400 through the system cable 600. In some embodiments, the RCU 300 may include a separate power input in addition to, or instead of the power 248 from the MPU 400.

The MPU 400 may be configured to interface with a video communication data link 220 configured to enable the MPU 400 to transmit and receive data through one or more networks (e.g., Internet Protocol (I.P.) networks, cellular data networks, satellite networks, Public Switched Telephone Networks (PSTNs), cloud networks, other networks, and combinations thereof). For example, he MPU 400 may be configured to transmit the near-end audio/video 150 to the far-end video endpoint 120 through the video communication data link 220, and receive and process the far-end audio/video 140 from the RCU 300 through the video communication data link 220.

The MPU 400 may also be operably coupled to the electronic display 210 through a video cable 260. By way of non-limiting example, the video cable may include a High-Definition Multimedia Interface (HDMI) cable, a Digital Visual Interface (DVI) cable, a Video Graphics Array (VGA) cable, a component ($YP_BP_R$) video cable, an S-Video cable, a composite video cable, other video cable, and combinations thereof. In some embodiments, the video cable 260 may be configured to conduct high-definition video data. The MPU 400 may be configured to display images (e.g., video images, still images, graphical user interface images, etc.) on a display element 212 of the electronic display 210, and play audio through speakers 214 of the electronic display 210. The MPU 400 may be configured to transmit display image audio/video data 262 (hereinafter "display audio/video" 262) including at least one of the display images and the audio through the video cable 260 to the electronic display 210.

The MPU 400 may be configured to present a Graphical User Interface (GUI) on the electronic display 210. The GUI may be configured to enable the audibly impaired user 110 (FIG. 1) to operate the video endpoint 200. For example, the MPU 400 may present user-selectable options on the electronic display 210, and the audibly impaired user 110 may navigate and select the user-selectable options using the remote control device 250.

During a communication session between the video endpoint 200 and the far-end video endpoint 120 (FIG. 1), the MPU 400 may receive and process the far-end audio/video 140 from the far-end video endpoint 120 through the video communication data link 220. The MPU 400 may generate the display audio/video 262 including video and audio from the far-end audio/video 140, and transmit the display audio/video 262 to the electronic display 210 through the video cable 260. The electronic display 210 may display the video and play the audio from the far-end audio/video 140 for the audibly impaired user 110 (FIG. 1). The camera 310 of the RCU 300 and the microphones 340 may record video and audio of the near-end, and the RCU 300 may transmit near-end video 242 and near-end audio 244 corresponding thereto, respectively, to the MPU 400 through the system cable 600. The MPU 400 may process the near-end video 242 and the near-end audio 244 to generate the near-end audio/video 150, and transmit the near-end audio/video 150 through the video communication data link 220 to the far-end video endpoint 120. In this way, the video endpoint 200 may enable the audibly impaired user 110 to participate in video communication sessions (and audio, to the extent the audibly impaired user 110 is capable).

Figure 3:
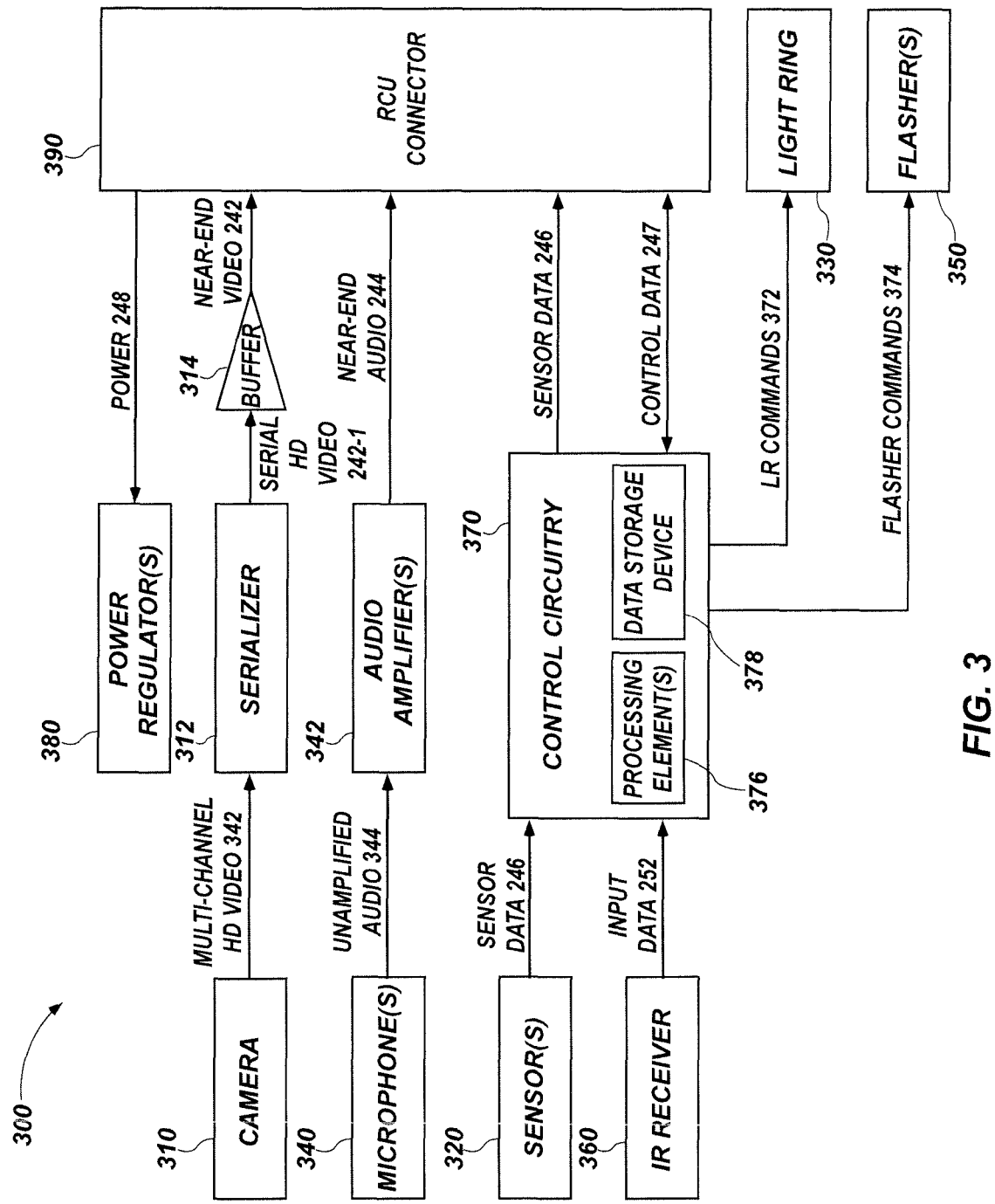
FIG. 3 is a simplified block diagram of an RCU of FIGS. 2A and 2B.

FIG. 3 is a simplified block diagram of the RCU 300 of FIG. 2B. As previously discussed, the RCU 300 may include a camera 310, microphones 340, sensors 320, an IR receiver 360, a light ring 330, and flashers 350. The RCU 300 may also include an RCU connector 390 configured to operably couple with a mating connector of the system cable 600. By way of non-limiting example, the RCU connector 390 may include an 18-pin micro HDMI connector configured to connect with a mating micro HDMI connector of the system cable 600.

The RCU 300 may include a serializer 312 and a buffer 314 operably coupled between the camera 310 and the RCU connector 390. The serializer 312 may be configured to convert (e.g., packetize) multi-channel HD Video data 342 (hereinafter "multi-channel HD video" 342) captured by the camera 310 into serial HD video 242-1. The buffer 314 may buffer the serial HD video 242-1 to output the near-end video 242 to the RCU connector 390.

The RCU 300 may also include one or more audio amplifiers 342 (referred to herein as "audio amplifiers" 342) operably coupled between the microphones 340 and the RCU connector 390. The audio amplifiers 342 may be configured to amplify audio 344 captured by the microphones 340, and provide the resulting near-end audio 244 to the RCU connector 390.

The RCU 300 may further include control circuitry 370 operably coupled to the sensors 320, the IR receiver 360, the light ring 330, and the flashers 350. The control circuitry 370 may be configured to receive and process sensor data 246 captured by the sensors 320, and input data 256 provided by the IR receiver 360. The control circuitry 370 may also be configured to provide the sensor data 246 to the RCU connector 390, and receive and provide control data 247 to the RCU connector 390. The control circuitry 370 may further be configured to control the light ring 330, and the flashers 350. By way of non-limiting example, the control circuitry 370 may be configured to provide light ring commands 372 (hereinafter "LR commands" 372) to the light ring 330, and flasher commands 374 to the flashers 350.

The control circuitry 370 may include at least one processing element 376 operably coupled to at least one data storage device 378 configured to store computer-readable instructions. The computer-readable instructions may be configured to instruct the processing element 376 to perform functions of the control circuitry 370. The processing element 376 may be configured execute the computer-readable instructions stored by the data storage device 378. By way of non-limiting example, the control circuitry 370 may include a microcontroller, a programmable logic controller (PLC), a digital signal processor (DSP), a field programmable gate array (FPGA), a system on chip (SOC) other processing element, or combinations thereof. Also by way of non-limiting example, the data storage device 378 may include an electrically erasable programmable read only memory (EEPROM), a Flash memory, other data storage device, or combinations thereof. The processing element 376 and the data storage device 378 may be implemented together within the same package, separately, or combinations thereof.

The RCU 300 may also include one or more power regulators 380 (hereinafter "power regulators" 380). The power regulators 380 may be operably coupled to the RCU connector 390, and configured to receive power 248 from the MPU 400 (FIG. 2B) through the RCU connector 390. The power regulators 380 may be configured to provide power to the various components of the RCU 300 (e.g., camera 310, microphones 340, sensors 320, IR receiver 360, light ring 330, flashers 350). By way of non-limiting example, the power regulators 380 may include voltage regulators configured to provide various different power supply voltages to the components of the RCU 300.

Figure 4:
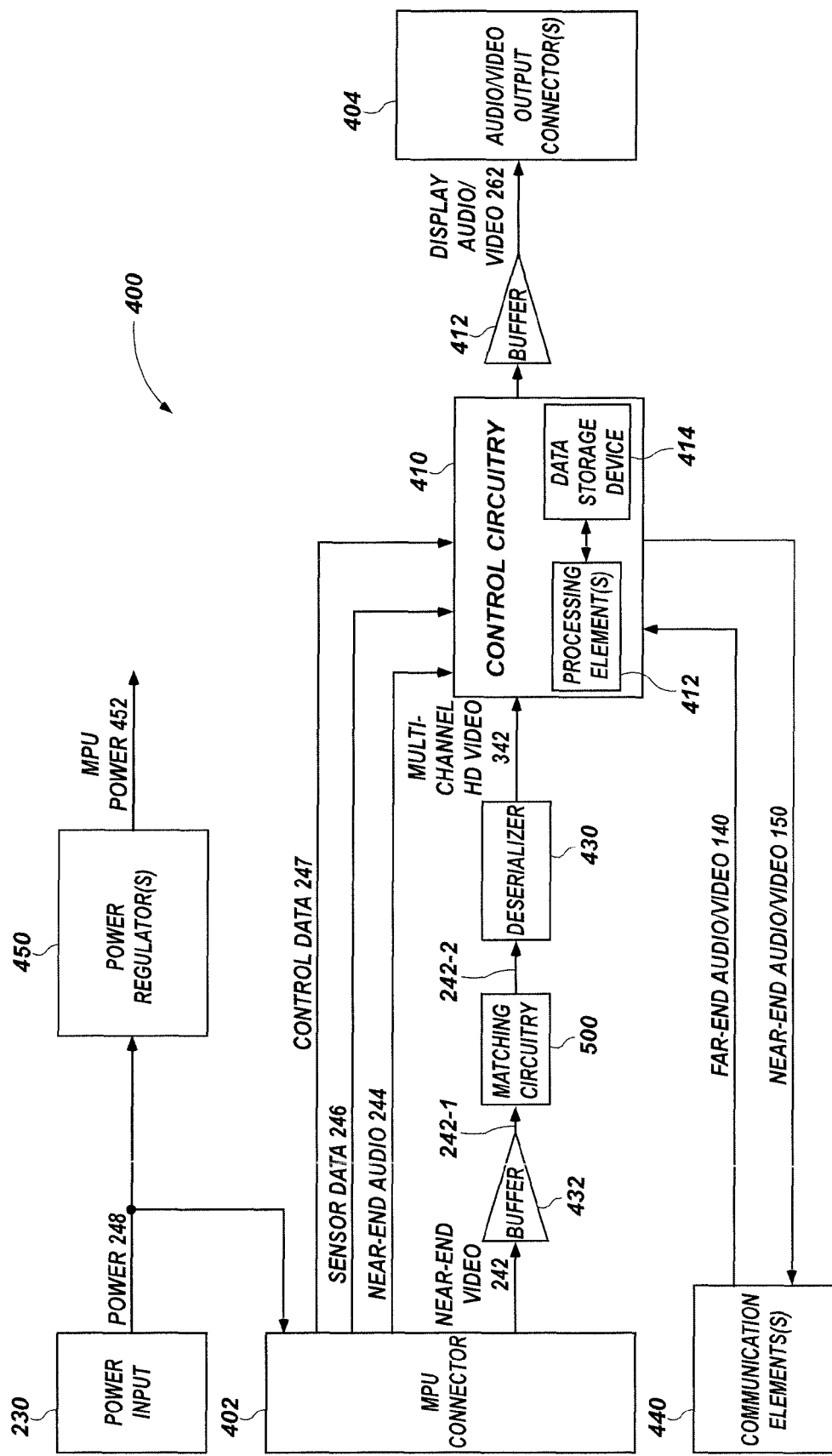
FIG. 4 is a simplified block diagram of an MPU of FIGS. 2A and 2B.

FIG. 4 is a simplified block diagram of the MPU 400 of FIG. 2B. The MPU 400 may include an MPU connector 402 configured to operably couple to a mating connector of the system cable 600 (FIG. 2B). By way of non-limiting example, the MPU connector 402 may include a 20-pin Mini Display Port connector configured to operably couple with a mating Mini Display Port connector of the system cable 600.

The MPU 400 may include control circuitry 410 operably coupled to the MPU connector 402 and configured to receive sensor data 246 and near-end audio 244 from the RCU 300 through the MPU connector 402. The control circuitry 410 may also be configured to transmit and receive control data 247 to and from the RCU 300 through the MPU connector 402.

The MPU 400 may also include a buffer 432, matching circuitry 500, and a deserializer 430 operably coupled between the MPU connector 402 and the control circuitry 410. The buffer 432 may be configured to buffer near-end video 242 received from the RCU 300 through the MPU connector 402, and apply the buffered near-end video 242-1 to the matching circuitry 500. The matching circuitry 500 may be configured to properly condition the buffered near-end video 242-1 for the deserializer 430, which may be configured to deserialize the buffered near-end video 242-1 into multi-channel HD video 342. High-speed serializers and deserializers known in the art that are capable of serializing and deserializing uncompressed high-definition video are generally designed for use with optical and coaxial cables, not for transmission of high-speed serialized data through a relatively long twisted pair. Accordingly, without the matching circuitry 500, the deserializer 430 may not properly deserialize the buffered near-end video 242-1. Further detail regarding the matching circuitry 500 will be discussed below with reference to FIG. 5. The MPU 400 may be configured to receive the multi-channel HD video 342 from the deserializer 430. During video communication sessions, the control circuitry 410 may be configured to generate the near-end audio/video 150 from the near-end audio 244 and the multi-channel HD video 342.

The MPU 400 may further include one or more communication elements 440 configured to enable the control circuitry 410 to communicate through the video communication data link 220 (FIG. 2B). By way of non-limiting example, the communication elements 440 may include a communication modem, a network cable connector (e.g., an Ethernet port, a coaxial port, other port), a wireless communication module (e.g., a Wifi transceiver, a bluetooth transceiver, a Zigbee transceiver, a mobile wireless transceiver, other device), and combinations thereof. The control circuitry 410 may be configured to transmit the near-end audio/video 150 to the far-end video endpoint 120 (FIG. 1) through the communication elements 440. The control circuitry 410 may also be configured to receive the far-end audio/video 140 from the far-end video endpoint 120 (FIG. 1), through the communication elements 440.

The MPU 400 may also include one or more audio/video output connectors 404 configured to operably couple to a mating audio/video connector of the video cable 260 (FIG. 2B). By way of non-limiting example, the audio/video output connectors 404 may include an HDMI connector, a DVI connector, a VGA connector, a component ($YP_BP_R$) video connector, an S-Video connector, a composite video connector, other connectors, and combinations thereof. The control circuitry 410 may be configured to output display audio/video 262 to the audio/video output connector(s) 262 through a buffer 412. The display audio/video 262 may include images and audio to be presented to the audibly impaired user 110 (FIG. 1) by the electronic display 210 (FIG. 2B). By way of non-limiting example, the display audio/video 262 may include GUI images, images corresponding to the far-end audio/video 140, images corresponding to the near-end audio/video 150, environmental information collected by the sensors 320 (FIG. 3), other items, or combinations thereof.

The MPU 400 may further include a power input 230 and one or more power regulators 450. Power 248 received from the power input 230 may be provided to the power regulators 450, which may provide MPU power 452 to the various components of the MPU 400. The power 248, the MCU power 452, or both may be provided to the RCU 300 through the MPU connector 402.

The control circuitry 410 may include at least one processing element 412 operably coupled to at least one data storage device 414, similar to the processing element 376 and the data storage device 378 of the control circuitry 370. By way of non-limiting example, the control circuitry may include a Tegra 3 processor, a system on chip manufactured by Nvidia. The control circuitry 410 may include other processing elements, however, without departing from the scope of the disclosure.

Figure 5:
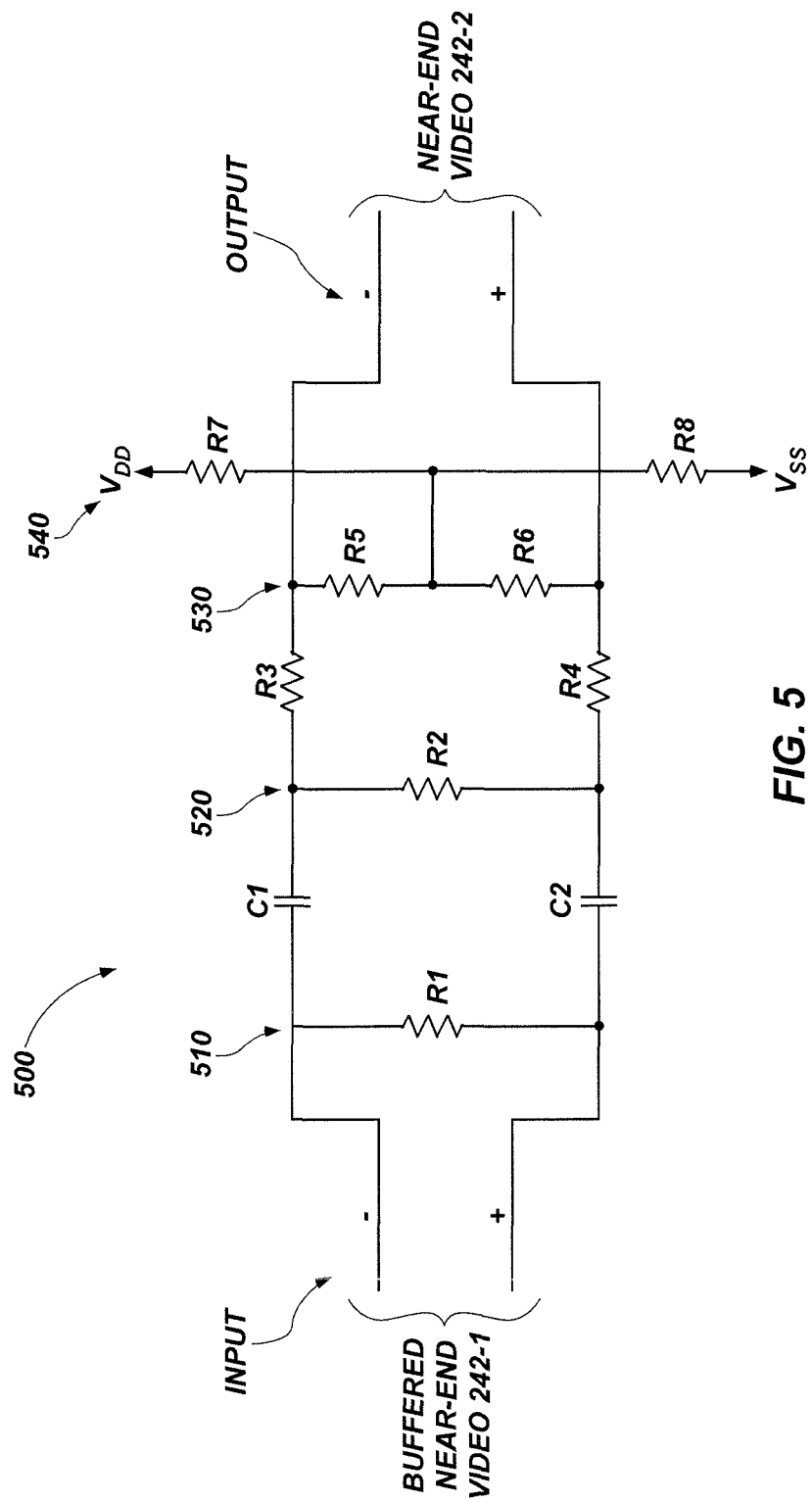
FIG. 5 is a simplified block diagram of an impedance matching circuit of the MPU of FIG. 4.

FIG. 5 is a simplified circuit schematic of the matching circuitry 500 of FIG. 4. The matching circuitry 500 may be configured to maintain the integrity of voltage potentials of signals delivering the serial HD video 242-1 to the MPU 400. An input of the matching circuitry 500 may include a negative μ and a positive + input, corresponding to μ and + channels of the buffered near-end video 242-1, which includes serial data. The matching circuitry 500 may be configured as an impedance ladder, including impedance elements (e.g., resistors, capacitors, etc.) in series with the − input and the + input, and including impedance elements in rungs parallel to the − input and the + input. A first rung 510 of the matching circuitry 500 may include a resistor R1 resistively coupling the − input to the + input. A second rung 520 may include a resistor R2. A capacitor C1 may be coupled in series with the − input between the first rung 510 and the second rung 520. Also, a capacitor C2 may be coupled in series with the + input between the first rung 510 and the second rung 520. A third rung 530 may include a resistor R5 operably coupled in series with a resistor R6. A resistor R3 may be operably coupled in series with the − input between the second rung 520 and the third rung 530. A resistor R4 may be operably coupled in series with the + input between the second rung 520 and the third rung 530.

A resistor branch 540 may include a resistor R7 and a resistor R8 operably coupled in series between a high voltage potential power source $V_{DD}$ and a low voltage potential power source $V_{SS}$ (e.g., a ground voltage potential). A node of the resistor branch 540 between resistor R7 and resistor R8 may be operably coupled to a node of the third rung 530 between R5 and R6. The third rung 530 may resistively couple a negative − output to a positive + output. The − output and the + output may correspond to the near-end video 242-2.

By way of non-limiting example, C1 and C2 may each be selected to have a capacitance of 1 nanofarad (nF). Also by way of non-limiting example, R2 may be selected to have 191 Ohms (Ω), R5 and R6 may be selected to have 97.6Ω each, R7 may be selected to have 15.4 kiloohms (kΩ), and R8 may be selected to have 1kΩ.

Figure 6:
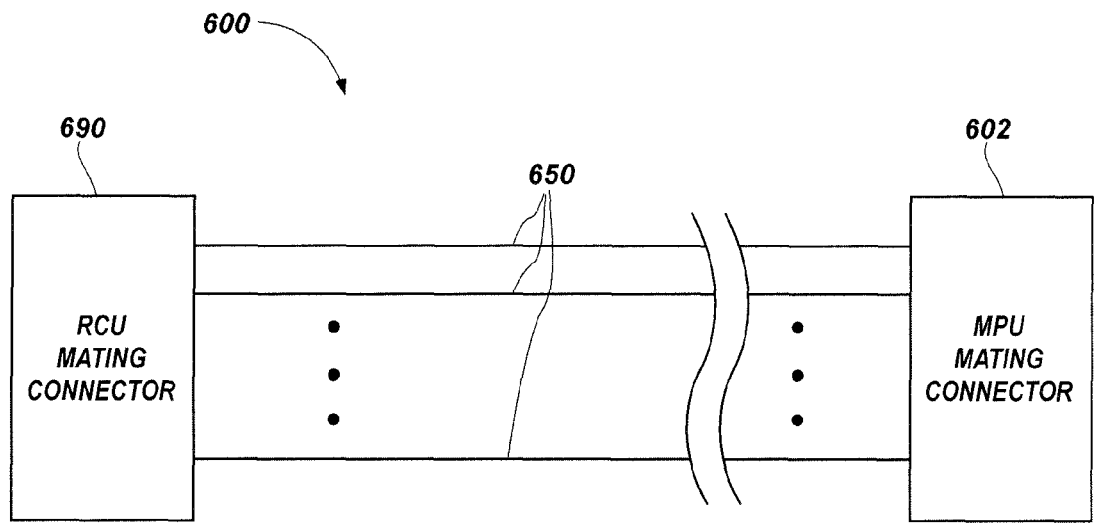
FIG. 6 is a simplified block diagram of a system cable of FIGS. 2A and 2B.

FIG. 6 is a simplified block diagram of the system cable 600 of FIG. 2B. The system cable 600 may include an RCU mating connector 690 and an MPU mating connector 602 operably coupled together by a plurality of twisted pairs 650. The RCU mating connector 690 may be configured to matingly couple to the RCU connector 390 (FIG. 3). By way of non-limiting example, the RCU mating connector 690 may include a micro HDMI connector. The MPU mating connector 602 may be configured to matingly couple to the MPU connector 490. By way of non-limiting example, the MPU mating connector 602 may include a Mini Display Port connector. In some embodiments, the mating connectors 602, 690 may be removably connected. In some embodiments, at least one mating connector (e.g., RCU mating connector 690) or both may be hardwired.

A single one of the plurality of twisted pairs 650 may be configured to conduct the near-end video 242 from the RCU 300 to the MPU 400. At least a portion of the other twisted pairs 650 may be configured to conduct the sensor data 246 and the near-end audio 244 from the RCU 300 to the MPU 400, the power 248 from the MPU 400 to the RCU 300, and the control data 247 between the RCU and the MPU 400.

Figure 7:
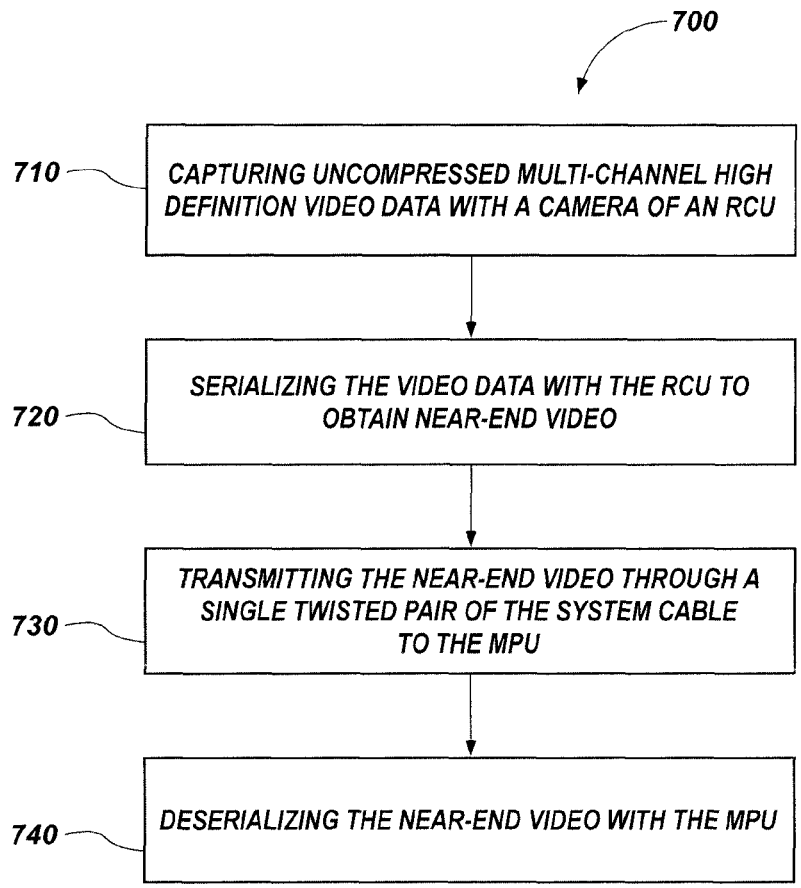
FIG. 7 is a flowchart illustrating a method of operating a high-speed video interface.

FIG. 7 is a simplified flow chart 700 illustrating a method of operating a high-speed video interface. Referring to FIGS. 2B and 7 together, at operation 710, the method may include capturing video data including uncompressed multi-channel high-definition video data 342 with a camera 310 of an RCU 300. In some embodiments, capturing the video data may include capturing video data including uncompressed, four-channel high-definition video data complying with a MIPI protocol.

At operation 720, the method may include serializing the video data with the RCU 300 to obtain near-end video 242. In some embodiments, serializing the video data may include serializing the video data into a single serial data stream.

At operation 730, the method may include transmitting the near-end video 242 through a single twisted pair 650 (FIG. 6) of a system cable 600 to an MPU 400. In some embodiments, transmitting the video data may include buffering the near-end video 242 before transmitting the near-end video 242.

At operation 740, the method may include deserializing the near-end video 242 with the MPU 400. In some embodiments, deserializing the near-end video 242 may include deserializing the near-end video 242 into four-channel high-definition video data complying with the MIPI protocol. In some embodiments, deserializing the near-end video 242 may include buffering the near-end video 242 before deserializing the near-end video 242. In some embodiments, deserializing the near-end video 242 may include applying the near-end video 242 to matching circuitry 500 (FIGS. 4 and 5) before deserializing the near-end video 242.

In some embodiments, operations 710 through 740 may be performed in a sufficiently small enough time to enable the MPU 400 to transmit near-end audio/video 150 (FIG. 1) including the near-end video 242 to a far-end video endpoint 120 (FIG. 1) in substantially real-time.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A high-speed video interface comprising:
    a system cable comprising one or more twisted pairs;
    a remote camera unit comprising:
        a camera configured to capture near-end video images, and provide video data comprising high-definition uncompressed multi-channel video data corresponding to the near-end video images; and
        a serializer configured to receive and serialize the video data into a single serial stream of serialized video data, and output the serialized video data to a single one of the one or more twisted pairs of the system cable;
    a main processing unit operably coupled to the remote camera unit through the system cable and configured to receive the serialized video data through the single one of the one or more twisted pairs of the system cable, the main processing unit comprising:
        a deserializer configured to deserialize the serialized video data; and
        a processing element configured to process the video data; and
    a matching circuit operably coupled to the deserializer and configured to maintain the integrity of voltage potentials of signals delivering the serialized video data to the main processing unit, wherein the matching circuit comprises:
        an input including a negative input terminal and a positive input terminal;
        an output including a negative output terminal a positive output terminal;
        a first resistor operably coupled across the negative input and the positive input;
        a first capacitor and a third resistor operably coupled in series between the negative input terminal and the negative output terminal with a first node therebetween;
        a second capacitor and a fourth resistor operably coupled in series between the positive input terminal and the positive output terminal with a second node therebetween;
        a second resistor coupled between the first node and the second node;
        a fifth resistor and a sixth resistor operably coupled in series between the negative output terminal and the positive output terminal with a third node therebetween; and
        a seventh resistor and an eighth resistor operably coupled in series between a high voltage potential power supply and a low voltage potential power supply with a fourth node therebetween, wherein the third node and the fourth node are coupled together.

2. The high-speed video interface of claim 1, wherein the remote camera unit includes one or more microphones configured to capture near-end audio and transmit audio signals corresponding to the near-end audio to the main processing unit through the system cable.

3. The high-speed video interface of claim 1, wherein the remote camera unit further includes one or more sensors configured to output sensor data, and wherein the remote camera unit is configured to transmit the sensor data to the main processing unit through the system cable.

4. The high-speed video interface of claim 3, wherein the one or more sensors include at least one sensor selected from the group consisting of an ambient light sensor, a temperature sensor.

5. The high-speed video interface of claim 1, wherein the matching circuit comprises an impedance ladder circuit including at least three resistive rungs.

6. The high-speed video interface of claim 1, wherein the main processing unit is configured to:
    receive far-end video from a far-end video endpoint;
    display the far-end video on an electronic display; and
    transmit the near-end video images to the far-end video endpoint in substantially real-time.

7. A method of operating a high-speed video interface, the method comprising:
    capturing video data comprising uncompressed high-definition multi-channel video data with a camera of a remote camera unit;
    serializing the video data into a single stream of serialized data;
    transmitting the serialized video data through a single twisted pair of a system cable through a matching circuit to a main processing unit, the matching circuit comprising:
        an input including a negative input terminal and a positive input terminal;
        an output including a negative output terminal a positive output terminal;
        a first resistor operably coupled across the negative input and the positive input;
        a first capacitor and a third resistor operably coupled in series between the negative input terminal and the negative output terminal with a first node therebetween;
        a second capacitor and a fourth resistor operably coupled in series between the positive input terminal and the positive output terminal with a second node therebetween;

a second resistor coupled between the first node and the second node;

a fifth resistor and a sixth resistor operably coupled in series between the negative output terminal and the positive output terminal with a third node therebetween; and a seventh resistor and an eighth resistor operably coupled in series between a high voltage potential power supply and a low voltage potential power supply with a fourth node therebetween, wherein the third node and the fourth node are coupled together; and deserializing the serialized video data with the main processing unit.

8. The method of claim 7, wherein deserializing the serialized video data comprises deserializing the serialized video data back into the video data comprising the uncompressed high-definition multi-channel video data.

9. A video endpoint specifically configured for use by an audibly impaired user to participate in video communication sessions with a video relay service, the video endpoint comprising:

a remote camera unit including:
　a camera configured to capture video data comprising multi-channel high-definition video data corresponding to near-end video; and
　a serializer operably coupled to the camera and configured to serialize the video data into a single serial data stream;

a system cable comprising one or more twisted pairs;

a main processing unit operably coupled to the remote camera unit through the system cable and configured to receive the single serial data stream from the remote camera unit through a single one of the one or more twisted pairs, wherein the main processing unit includes:
　a deserializer configured to convert the single serial data stream into the multi-channel high-definition video data; and
　a processing element configured to receive and process the multi-channel high-definition video data; and a matching circuit operably coupled to the deserializer and comprising:
　an input including a negative input terminal and a positive input terminal;
　an output including a negative output terminal a positive output terminal;
　a first resistor operably coupled across the negative input and the positive input;
　a first capacitor and a third resistor operably coupled in series between the negative input terminal and the negative output terminal with a first node therebetween;
　a second capacitor and a fourth resistor operably coupled in series between the positive input terminal and the positive output terminal with a second node therebetween;
　a second resistor coupled between the first node and the second node;
　a fifth resistor and a sixth resistor operably coupled in series between the negative output terminal and the positive output terminal with a third node therebetween; and
　a seventh resistor and an eighth resistor operably coupled in series between a high voltage potential power supply and a low voltage potential power supply with a fourth node therebetween, wherein the third node and the fourth node are coupled together.

10. The video endpoint of claim 9, wherein the main processing unit is configured to operably couple to an electronic display and present a graphical user interface on the electronic display, wherein the graphical user interface is configured to enable the audibly impaired user of the video endpoint to operate the video endpoint.

11. The video endpoint of claim 10, further comprising an infrared remote control including:
　input devices configured to enable the user to interact with the graphical user interface; and
　an infrared transmitter configured to transmit infrared signals indicating user inputs to the input devices.

12. The video endpoint of claim 11, wherein the remote camera unit includes an infrared receiver configured to receive the infrared signals and wherein the remote camera unit is configured to relay the user inputs to the main processing unit through the system cable.

13. The video endpoint of claim 11, wherein the main processing unit includes an infrared receiver configured to receive the infrared signals.

14. The video endpoint of claim 9, wherein the main processing unit is configured to transmit control data to the remote camera unit through the system cable, wherein the control data is configured to control functions of the remote camera unit.

15. The video endpoint of claim 14, wherein the remote camera unit includes at least one of:
　a light ring configured to provide visual caller identification, and wherein the control data is configured to at least partially control the light ring; and
　one or more flasher devices configured to indicate an incoming call to the video endpoint, and wherein the control data is configured to at least partially control the one or more flasher devices.

16. The video endpoint of claim 9, wherein the system cable has a length between about two feet and ten feet.

17. The video endpoint of claim 9, wherein the system cable includes a mini DisplayPort configured to operably couple the system cable to the main processing unit, and a micro HDMI connector configured to operably couple the system cable to the remote camera unit.

18. The video endpoint of claim 9, wherein the main processing unit is configured to transmit power to the remote camera unit through the system cable, and wherein the remote camera unit is configured to power at least one of the camera and the serializer with the power received from the main processing unit.

19. A video endpoint configured to enable an audibly impaired user to participate in communication sessions with far-end users of audio endpoints with the assistance of a video relay service configured to provide translation between video communications of the video endpoint and voice communications of the audio endpoint, the video endpoint comprising:

a system cable comprising a remote camera unit connector, a main processing unit connector, and one or more twisted pairs operably coupling the remote camera unit connector to the main processing unit connector;

a remote camera unit configured to operably couple to the remote camera unit connector of the system cable, the remote camera unit including:
　a camera configured to capture video data comprising multi-channel high-definition video data corresponding to near-end video of the audibly impaired user communicating using non-verbal gestures; and a serializer operably coupled to the camera and configured to serialize the video data into a single serial data stream; and a main processing unit operably coupled to the main processing unit connector of the system cable and to an electronic display through a video cable, the main processing unit configured to receive the single serial data stream from the remote camera unit through a single one of the one or more twisted pairs, wherein the main processing unit includes:

a deserializer configured to convert the single serial data stream into the multi-channel video signal;

one or more communication elements configured to enable the main processing unit to communicate with the video relay service through a video data link; and control circuitry configured to:
receive the multi-channel video signal from the deserializer;
transmit the near-end video to the relay service through the one or more communication elements;
receive far-end video from the relay service through the one or more communication elements; and
display the far-end video on the electronic display.

20. The video endpoint of claim 19, further comprising a matching circuit operably coupled to the deserializer and comprising:

an input including a negative input terminal and a positive input terminal;

an output including a negative output terminal a positive output terminal;

a first resistor operably coupled across the negative input and the positive input;

a first capacitor and a third resistor operably coupled in series between the negative input terminal and the negative output terminal with a first node therebetween;

a second capacitor and a fourth resistor operably coupled in series between the positive input terminal and the positive output terminal with a second node therebetween;

a second resistor coupled between the first node and the second node;

a fifth resistor and a sixth resistor operably coupled in series between the negative output terminal and the positive output terminal with a third node therebetween; and a seventh resistor and an eighth resistor operably coupled in series between a high voltage potential power supply and a low voltage potential power supply with a fourth node therebetween, wherein the third node and the fourth node are coupled together.

21. The video endpoint of claim 19, wherein the single one of the one or more twisted pairs has a length between about two feet to ten feet.

* * * * *